United States Patent
Holmes et al.

(10) Patent No.: US 10,474,706 B2
(45) Date of Patent: Nov. 12, 2019

(54) ORGANIZING SPEECH SEARCH RESULTS

(71) Applicant: Avaya Inc., Santa Clara, CA (US)

(72) Inventors: Wendy J. Holmes, Worcestershire (GB); David Skiba, Golden, CO (US)

(73) Assignee: Avaya Inc., Santa Clara, CA (US)

(*) Notice: Subject to any disclaimer, the term of this patent is extended or adjusted under 35 U.S.C. 154(b) by 383 days.

(21) Appl. No.: 15/154,000

(22) Filed: May 13, 2016

(65) Prior Publication Data
US 2017/0329841 A1   Nov. 16, 2017

(51) Int. Cl.
*G06F 16/00*   (2019.01)
*G06F 16/33*   (2019.01)
*G06F 17/27*   (2006.01)
*G10L 15/02*   (2006.01)
*G06F 16/332*  (2019.01)

(52) U.S. Cl.
CPC ...... *G06F 16/3343* (2019.01); *G06F 16/3329* (2019.01); *G06F 17/2735* (2013.01); *G10L 15/02* (2013.01)

(58) Field of Classification Search
CPC ......... G06F 17/30654; G06F 17/30681; G06F 16/63; G06F 16/638
See application file for complete search history.

(56) References Cited

U.S. PATENT DOCUMENTS

| 7,716,235 B2 * | 5/2010 | Davallou | G06F 17/3061 707/759 |
| 2009/0043581 A1 * | 2/2009 | Abbott | G10L 15/187 704/254 |
| 2010/0306708 A1 * | 12/2010 | Trenz | G06F 3/0482 715/853 |
| 2011/0208708 A1 * | 8/2011 | Liu | G06F 16/3322 707/706 |
| 2013/0262124 A1 | 10/2013 | Ponting | |
| 2014/0236572 A1 * | 8/2014 | Meshulam | G06F 16/3329 704/9 |
| 2016/0210353 A1 | 7/2016 | Holmes et al. | |

OTHER PUBLICATIONS

Vinothharshad, EXCEPT vs NOT IN in SQL Server—Code Project, Jul. 10, 2013, https://www.codeproject.com/Articles/619094/EXCEPT-vs-NOT-IN-in-SQL-Server.*

* cited by examiner

*Primary Examiner* — Thu Nguyet T Le
(74) *Attorney, Agent, or Firm* — Sheridan Ross P.C.

(57) ABSTRACT

A method, system, and phonetic search engine are described that enable phonetic searches to have increased relevancy to the searcher. Specifically, phonetic searches on a database containing phonetically-searchable content can have one or more phonetically-confusable terms included therein, thereby creating search results that more faithfully reflect the search terms used during the phonetic search of the database.

20 Claims, 13 Drawing Sheets

ORGANIZING SPEECH SEARCH RESULTS

BACKGROUND

Phonetic speech search involves searching a database containing audio records for words and phrases by matching to a model of the expected possible sound patterns of the search term. This technique contrasts with speech-to-text (STT)-based approaches that search the output of a large-vocabulary speech recognizer. An advantage of the phonetic search approach is that the phonetic search approach is not constrained by vocabulary or recognition errors of any STT system. However, phonetic searching can suffer from false matches on similar-sounding but unwanted phrases. For example, searching for the word "contract" in speech that contains the word "contact" is likely to give false matches. If there is a large amount of audio containing similar-sounding but unwanted phrases, the extent of these false matches can lead to poor search results.

One way of addressing this problem is to try to specify sufficiently long search phrases to neutralize the effect of confusable words. For example, a search for "cancel my contract" may not give any false hits on "contact" if the word "contact" is not preceded by "cancel my." Facilities for manually filtering and tagging results may also be offered. Unfortunately, these solutions are cumbersome and can result in certain relevant audio records not being returned because they do not exactly match the longer search phrase.

Accordingly, a need exists for an improved phonetic speech searching solution that avoids false matching problems, but also utilizes simple search strategies.

BRIEF DESCRIPTION OF THE DRAWINGS

The present disclosure is described in conjunction with the appended figures.

DETAILED DESCRIPTION

Figure 1:
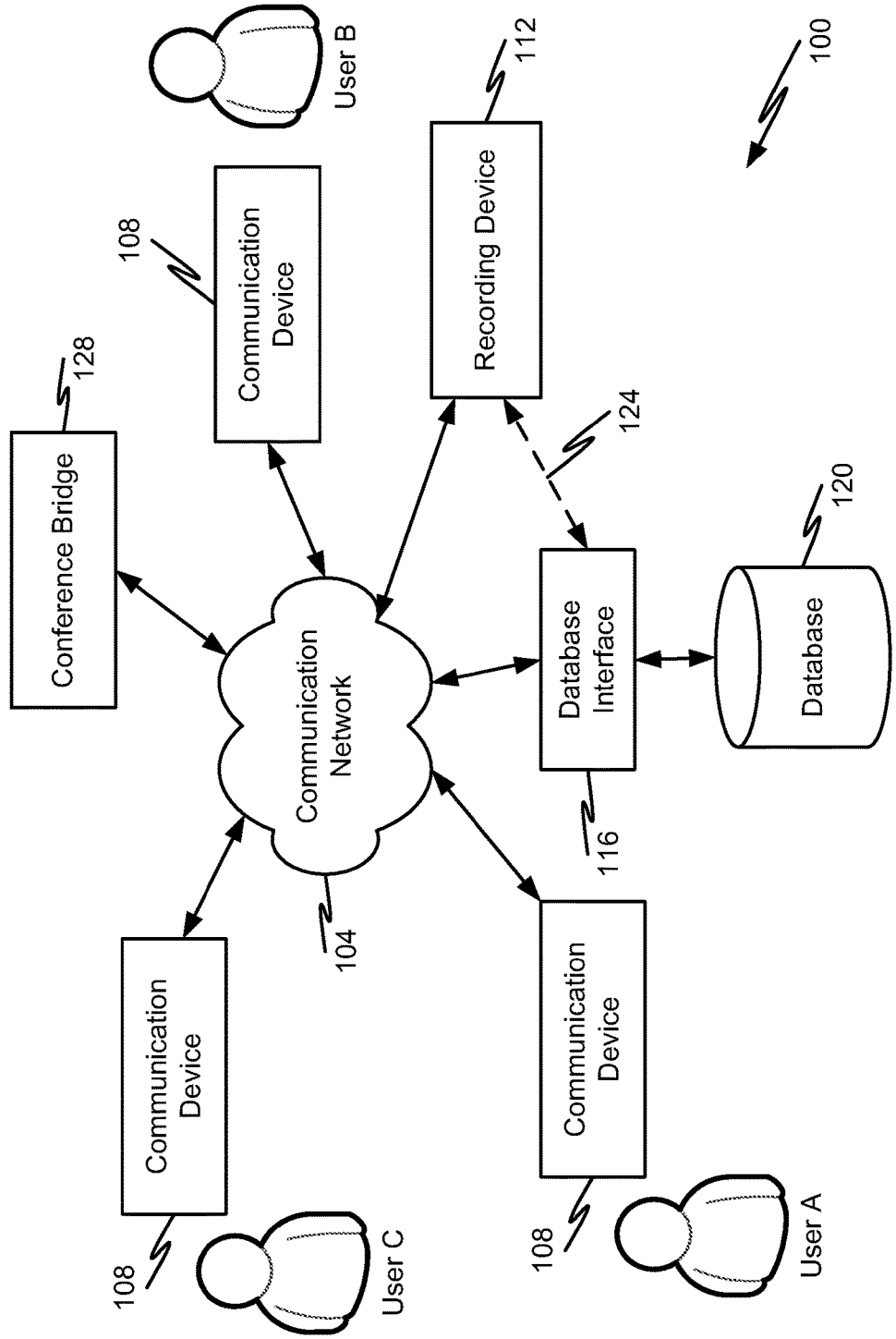
FIG. 1 is block diagram depicting a communication system in accordance with embodiments of the present disclosure.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

It should be appreciated that embodiments of the present disclosure can be utilized in numerous environments where it is desirable to search databases for, among other things, audio/audible content. The audio/audible content may include pure audio files or clips, video files or clips, or any other data structure that has content therein that is searchable phonetically. While embodiments of the present disclosure will be described in connection with storing audio content from a communication session between two or more session participants (e.g., two or more humans, one human and one or more automated participants, one or more humans and one automated participant, a conference, a broadcast, voicemails, etc.), it should be appreciated that embodiments of the present disclosure are not so limited. Indeed, some embodiments described herein can be applied to searching audio/audible content from something other than a communication session. For instance, embodiments of the present disclosure can be applied to searching music libraries/databases, video libraries/databases (e.g., the audio content thereof), searching within an audio file (e.g., WAV files, AIFF files, MP3 files, etc.), searching within a video file (e.g., CCIR 601, MPEG-4, MPEG-2, MPEG-1, H.261, H.263, H.264, etc.), and the like.

Furthermore, while the illustrative embodiments herein show the various components of a system collocated, it is to be appreciated that the various components of the system can be located at distant portions of a distributed network, such as a communication network and/or the Internet, or within a dedicated secure, unsecured, and/or encrypted system. Thus, it should be appreciated that the components of the system can be combined into one or more devices, such as an enterprise server or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof.

In view of the issues related to prior art speech searching technologies, it is one aspect of the present disclosure to provide a phonetic search solution. Embodiments of the present disclosure address the problem of false matches on similar-sounding phrases by utilizing the fact that the alternative similar-sounding phrase will, in general, match better to the region of audio in question. One aspect of the present disclosure is to allow the user of the speech search system to explicitly exclude any regions of audio that match better to known unwanted terms. For example, a phonetic search for "contact BUT NOT contract" would search for matches to the word "contact" but exclude any matches for which the same region of audio matched better to the alternative term "contract".

Embodiments of the present disclosure operate by conducting searches for one or more competing/similarly sounding terms as well as a search for the term of interest. For each hit on the term of interest, the hit is removed if there are any higher-confidence matches on the competing terms that are on the same or substantially overlapping region of audio.

In one embodiment, the user would specify the competing terms. However, it may also be possible to generate a set of confusable terms automatically: for example by selecting phonetically-confusable words from a pronunciation dictionary.

In the automatic generation of confusable terms, the system may generate a cluster or define a predetermined phonetic distance from the term of interest. Specifically, depending upon a user's tolerance for false positive hits, the phonetic distance can be varied to include more or less phonetically-confusable terms. If the user prefers potentially excluding some passages of interest to avoid too much noise (e.g., false positive search results), the phonetic distance may be increased, thereby including more phonetically-confusable words in the "BUT NOT" operator. On the other hand, if the user prefers over inclusion at the expense of some false positive hits, the phonetic distance may be decreased, thereby decreasing the number of phonetically-confusable words in the "BUT NOT" operator. A hybrid approach could also be used whereby the system automatically generates a set of phonetically-confusable terms and then allows the user to select whether or not to include those terms in the "BUT NOT" operator.

Embodiments of the present disclosure also have increased value due to the variety of deployment options. In one embodiment, the searching solution described herein can be implemented into a speech search provider (e.g., as a built-in feature of an audio database or a search engine for an audio database). Alternatively or additionally, a portion of the searching solution (e.g., automatic term expansion with BUT NOT operators) can be implemented as a pre-processing step to other speech search providers.

The proposed solution acts to remove unwanted search results and so improve overall accuracy of the search system. The idea differs from the AND NOT Boolean operator that is sometimes used in search systems in that the proposed solution explicitly filters out competing matches on the same region of audio based on relative confidence scores. This is in contrast to the more standard AND NOT which, in the context of audio search, would look for audio containing occurrences of one term that did not also contain hits on another term. In the case of similar-sounding phrases or phrase portions, it is likely that all audio containing hits on the one term would also contain hits on the other term without the explicit filtering based on time and confidence information that is the subject of the current invention.

Accordingly, it is one aspect of the present disclosure to facilitate the exclusion of search hits based on a comparison of scores for competing similar search terms on the same region of audio as well as the automatic identification of phonetically-confusable words for inclusion in the "BUT NOT" operator to reduce search results and increase search accuracy.

In some embodiments, a solution is proposed whereby speech search results can be intelligently organized depending upon whether the results are phonetically closer to a desired search term, an undesired search term, and/or relative confidences of the true and competing matches. Alternatively or additionally, the confidence of a true hit (e.g., positive result to a search query) may be reduced by some amount dependent on the confidence of the competing match (e.g., instead of removing the search result entirely) and/or having the degree of phonetic similarity taken into account.

In some embodiments, search results can be organized into silos or columns whereby the results of the search are identified as being phonetically closer to either the desired search term(s) or the undesired/unwanted search term(s). Indications of phonetic distance or relative phonetic distance (e.g., an indication of closer or further from desired and undesired/unwanted search terms) can be displayed along with the search results. Furthermore, the search results can be organized/ordered according to phonetic distance (or some other relative confidence metric) from desired and/or undesired/unwanted search terms. In the event that search results should be completely removed/discarded, then one or multiple distance thresholds may be applied to the calculated phonetic distances for search terms. It may be desirable to require a greater difference in confidence for a phonetically almost identical undesired term than for one with less phonetic similarity to the desired term (the first case could be just a slight mispronunciation, whereas the second suggests a more substantially different phrase).

Consider the following non-limiting example: A user performs a speech search for CONTRACT BUT NOT CONTACT. The search of the speech database retrieves three results with the following phonetic distances: RESULT 1 (distance to CONTRACT=1; distance to CONTACT=10); RESULT 2 (distance to CONTRACT=5; distance to CONTACT=5; and RESULT 3 (distance to CONTRACT=8; distance to CONTACT=2).

The results in this situation may all be presented to the user along with their calculated phonetic distances to the desired and undesired search terms. Alternatively or additionally, the results may be organized in order based on those results that are closest to the desired search term. Alternatively or additionally, the relative confidences of each result (e.g., an inverse ratio of distance to desired and undesired search term) may be calculated and displayed along with the search results. In the above example, RESULT 1 would have a relative confidence of 1/0.1 or 10, RESULT 2 would have a relative confidence of 1/1 or 1, and RESULT 3 would have a relative confidence of ¼ or 0.25.

In some embodiments, the user could additionally perform speech searches for CONTRACT BUT NOT ACTOR and CONTRACT BUT NOT INTACT. An expansion would be to set a confidence threshold for absolutely excluding results. Continuing the above example, imagine that RESULT 4 has a distance to CONTRACT=9 and distance to CONTACT=1. A confidence threshold may be set that excludes RESULT 4 but still presents RESULT 3. The confidence threshold, in some embodiments, may be based on a relative confidence of the term being a true match as compared to a competing match.

In some embodiments, the proposed solution acts to organize speech search results instead of simply removing unwanted search results. This may provide advantages as compared to a typical n-best list of results, which include: (1) showing and distinguishing distance from similar or confusable terms (those you might want to use in "BUT NOT") instead of just general term scores with the value of being able to measure degree of phonetic similarity and (2) there may be a visual component for displaying the results (even those which are less relevant than others) which adds value over n-best text lists.

The terms "distance" or "phonetic distance" as used herein can correspond to any type of distance determination or calculation. In particular, a phonetic distance may correspond or represent the "goodness of match" between a search term and a search result. As an example, a goodness of match or phonetic distance may actually be modeled as a probability, where it is common to use negative log probabilities and refer to these values as "distances." Thus, anything representing "goodness of match" may be as a replaceable term for phonetic distance. As some non-limiting examples, goodness of match may be modeled as distance (where lower is closer and a better match), probability (where higher is closer and a better match), or any other measure that can be used to evaluate similarity.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed. The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

With reference initially to FIG. 1, an illustrative system 100 in which audio content is created and stored in a database 120 will be described in accordance with at least some embodiments of the present disclosure. The system 100 is shown to include a communication network 104, multiple communication devices 108 (operated by one or more users), a recording device 112, a database interface 116, a database 120, and a conference bridge 128.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a LAN, a WAN, a Session Initiation Protocol (SIP) network, a Voice over IP (VoIP) network, a cellular network, an enterprise network, a contact center, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, a communication device 108 may include a personal communication device or a shared communication device (e.g., a conference phone). Examples of suitable communication devices 108 include, without limitation, a telephone, a softphone, a cellular phone, a multi-speaker communication device (e.g., a conference phone), a video phone, a PC, a laptop, a tablet, a PDA, a smartphone, a thin client, or the like. The communication devices 108 may be pure consumers of audio/video (e.g., having a speaker only and/or having a screen only), pure producers of audio/video (e.g., having a microphone and/or camera only), or consumers and producers of audio/video. It should be appreciated that a communication device 108 may be configured to support single or multi-user interactions with other network-connected devices within an enterprise communication network and/or across multiple communication networks (e.g., across Session Border Controllers (SBCs)).

The recording device 112 may correspond to one or more network-connected resources that are capable of recording media exchanged during a communication session between two or more communication devices 108 or between a communication device 108 and an automated resource (e.g., voicemail, Interactive Voice Response (IVR) system, etc.). The recording device 112 may be inserted in a media path between the communication devices 108 operated by the communication session participants or the recording device 112 may receive a copy of media exchanged between communication devices 108 during a communication session. As a non-limiting example, the recording device 112 may be implemented as a call-recording application that is inserted during call set-up and inserted as a sequenced application (e.g., a Back-to-Back User Agent (B2BUA)) into the call vector. Situating the recording device 112 in such a way enables the recording device 112 to capture the media exchanged during a communication session.

As shown in FIG. 1, the recording device 112 may then interact with the database interface 116 to have the recorded content of the communication session stored in the database 120. This interaction may be via the communication network 104 or directly through a direct connection 124. In some embodiments, the recording device 112 and database interface 116 may be implemented in a common server, thereby obviating the need for network-based connections.

In embodiments where the recorded audio/video corresponds to content from a broadcast or from a dedicated recording session (e.g., a studio recording of an album track), the recording device may 112 may correspond to a purpose-built device that records content received from a speaker and/or camera and then formats the content (e.g., compresses, encodes, etc.) for storage in the database 120. It should be appreciated that the recorded content may be stored using lossy or lossless encoding techniques and any type of storage format may be used for storing the content within the database 120. Furthermore, the content may be indexed for easier searching and/or retrieval. Such indexing may be performed prior to storage or post storage in the database 120. The indexing may be stored at the database interface 116 or with the content in the database 120. Indexing engines are well known in the database and searching arts and will not be described in further detail herein. Although not depicted, it should be appreciated that an indexing engine may be implemented within the database interface 116 or at a separate server.

The database 120 and database interface 116 may correspond to any type of known or yet to be developed type of database and interface. Said another way, the construction of the database and its interface is not intended to be limited by embodiments of the present disclosure. Suitable non-limiting examples of databases 120 that may be used to store audio/video content and/or any other content that is phonetically-searchable include a hierarchical database, a graph database, a relational database, a network database, an object-oriented database, or the like. The database interface 116 may utilize a language or format that is operable to extract useful information from the database 120. Examples of languages that may be used by the database interface 116 include, without limitation, SQL, noSQL, NewSQL, and/or any other type of Database Management System (DBMS) known in the art. The database interface 116 is intended to facilitate interactions between the database 120 and other network devices (e.g., communication devices 108, recording device 112, conference bridge 128, etc.). The database interface 116 may be implemented as one or many servers, depending upon the size and complexity of the database 120.

The conference bridge 128 may correspond to a device (e.g., server) or collection of devices that enable media mixing and distribution during a communication session between two or more and usually three or more session participants. In some embodiments, the conference bridge 128 may include a media mixer and logic for distributing the mixed media among the conference participants. The conference bridge 128 may even provide a fully-mixed version of the conference to the recording device 112 for recording and storage in the database 120. Alternatively or additionally, the recording device 112 may be included as a conference participant in a communication session and may, therefore, connect to the conference bridge 128 like other communication devices 108.

Figure 2:
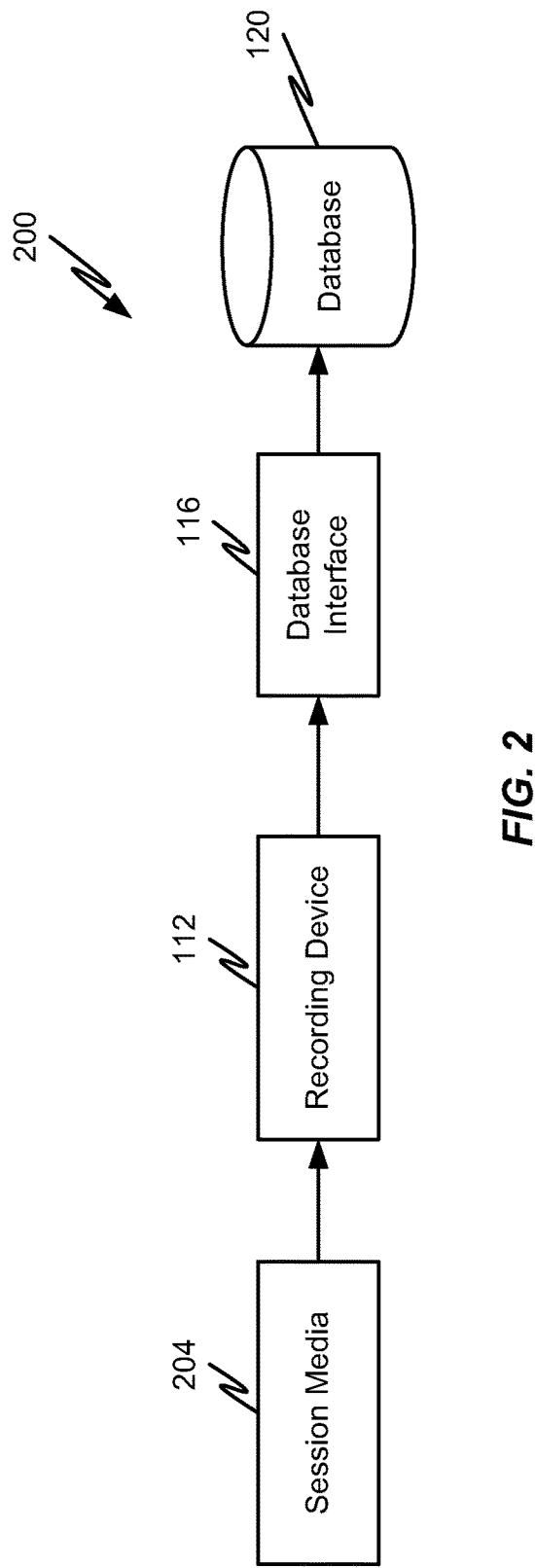
FIG. 2 is a block diagram depicting a system for recording and storing audio from a communication session in accordance with embodiments of the present disclosure.

With reference now to FIG. 2, additional details of a system 200 for capturing and storing audio/audible content will be described in accordance with at least some embodiments of the present disclosure. The system 200 illustrates the interconnection between the recording device 112, database interface 116, and database 120. It should be appreciated that the system 200 is not necessarily limited to single instances of any component. Indeed, the system 200 may include multiple databases 120, multiple database interfaces 116, and/or multiple recording devices 112. The multiple devices may be partitioned, highly-scalable, or configured for high-availability (e.g., with back-up devices). The simple illustration of the system 200 and its components is intended to provide an easy-to-understand description of the operation of the system 200 components.

In some embodiments, a communication session may be established between two or more communication devices 108. The communication session may include session media 204 in the form of audio packets, video packets, analog audio, analog video, compressed audio, compressed video, encoded audio, encoded video, etc. that is transmitted from one communication device 108 to another or between a communication device 108 and the conference bridge 128. The session media 204 may be received at the recording device 112 and formatted for transmission to the database interface 116. In some embodiments, the recording device 112 may simply encode and/or compress the session media 204 for efficient storage in the database 120. In more sophisticated systems 200, the recording device 204 may further perform a first analysis of the session media 204 to create metadata or tags for the session media 204 before it is recorded in the database 120. For instance, the recording device 112 may create metadata describing the time at which the session media 204 is received, an identification of the session participants, a descriptor of the session type (e.g., two participant session, three or more participant session, conference, broadcast, etc.). In some embodiments, the recording device 112 may even perform a phonetic and/or phoneme analysis of the session media 204. The results of such an analysis may be stored with the session media as metadata or it may be converted to text that is searchable at a later time. It may even be possible for the recording device 112 to perform a speech-to-text conversion of some or all of the session media 204 prior to storing the session media in the database 120.

At some point during or after storage of the session media (or any audio/audible media), the recording device 112 or some other indexing engine can perform an indexing of the database 120 and the media stored thereon. This indexing engine can then be an initial point of reference when searching the database 120 for stored content.

Figure 3:
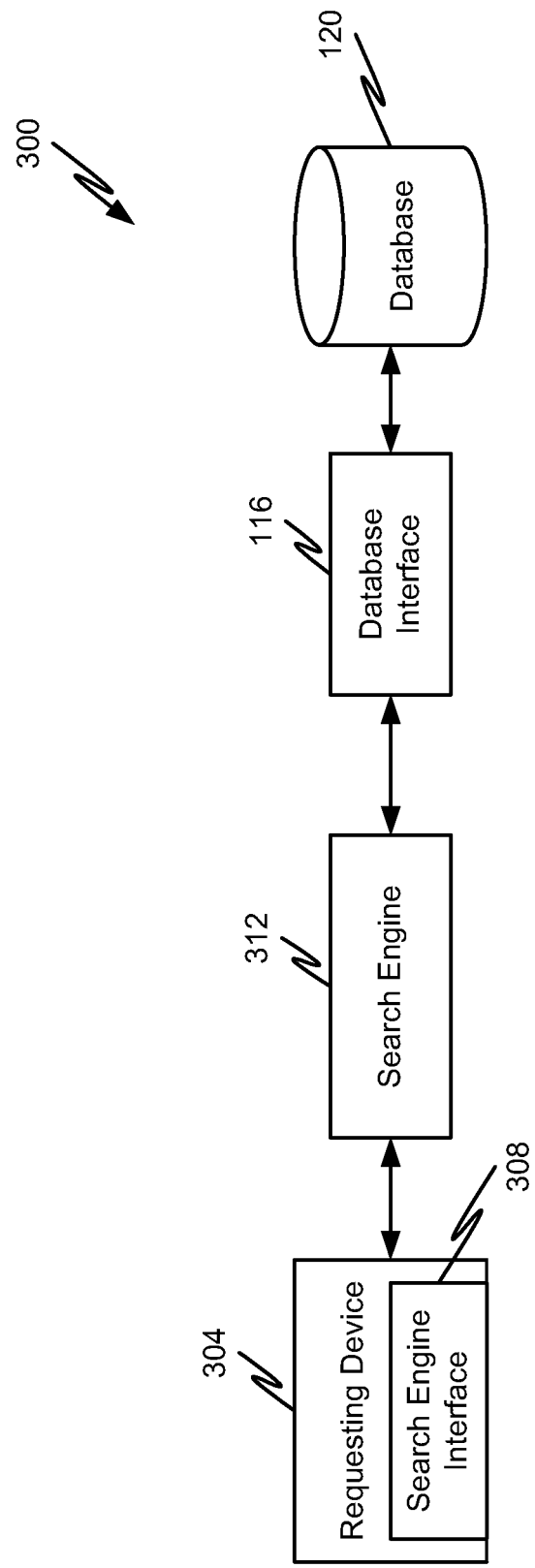
FIG. 3 is a block diagram depicting a system for searching a database in accordance with embodiments of the present disclosure.

With reference now to FIG. 3, details of a system 300 for retrieving content or searching the database 120 will be described in accordance with at least some embodiments of the present disclosure. The system 300 again includes the database 120 and database interface 116. The system 300 is also shown to include a requesting device 304 and a search engine 312. In some embodiments, the requesting device 304 may be provided with one or more search engine interfaces 308 that enable the requesting device 304 to communicate with the search engine 312.

As discussed above, part of maintaining a searchable database 120 may include periodically indexing content stored in the database 120. To this point, such indexing has been described as being performed by a separate indexing engine or by the database interface 116. It should be appreciated that some or all database indexing functions may be performed in the search engine 312. The search engine 312 may correspond to the engine that exposes the database interface 116 and useable query language to a user of the requesting device 304. In some embodiments, the search engine 312 may limit or provide search structure to users of the requesting device 304. The search engine 312 may also be responsible for receiving a search query or search terms and formatting the search query or terms in a format that is understood by the database interface 116.

In some embodiments, the search engine interface 308 may be in the form of a browser, application, or the like. The search engine interface 308 may be natively operating on the requesting device 304 (e.g., as an installed application) or the search engine interface 308 may be made available to the requesting device 304 via a web browser. In particular, the search engine interface 308 may correspond to an HTML page of a web server that interacts with the search engine 312.

When attempting to retrieve content from the database 120, a user may enter one or more search terms into a search term input provided by the search engine interface 308. The one or more search terms entered by the user may be provided to the search engine 312. The search engine 312 may then format and provide the entire search terms as received from the interface 308 to the database interface 116 as a structured or unstructured query consistent with a format understood by the database interface 116. Alternatively, the search engine 312 may modify the search terms to include more or less search terms depending upon an analysis of the search terms received from the user. As an example, the search engine 312 may be configured to determine one or more phonetically-confusable (e.g., similar sounding) terms for the search term(s) entered by the user. These phonetically-confusable terms may be included in a "BUT NOT" operation provided to the database interface 116, meaning that the search engine 312 desires to receive content matching the search term(s) but not content also matching (or more similarly matching) the phonetically-confusable terms included in the "BUT NOT" operation.

The content matching the requested search terms is then provided back to the search engine 312 via the database interface 116 and then is presented to the user via the search engine interface 308. The format of the presentation may vary depending upon user preferences and/or relevance of search results.

Figure 4:
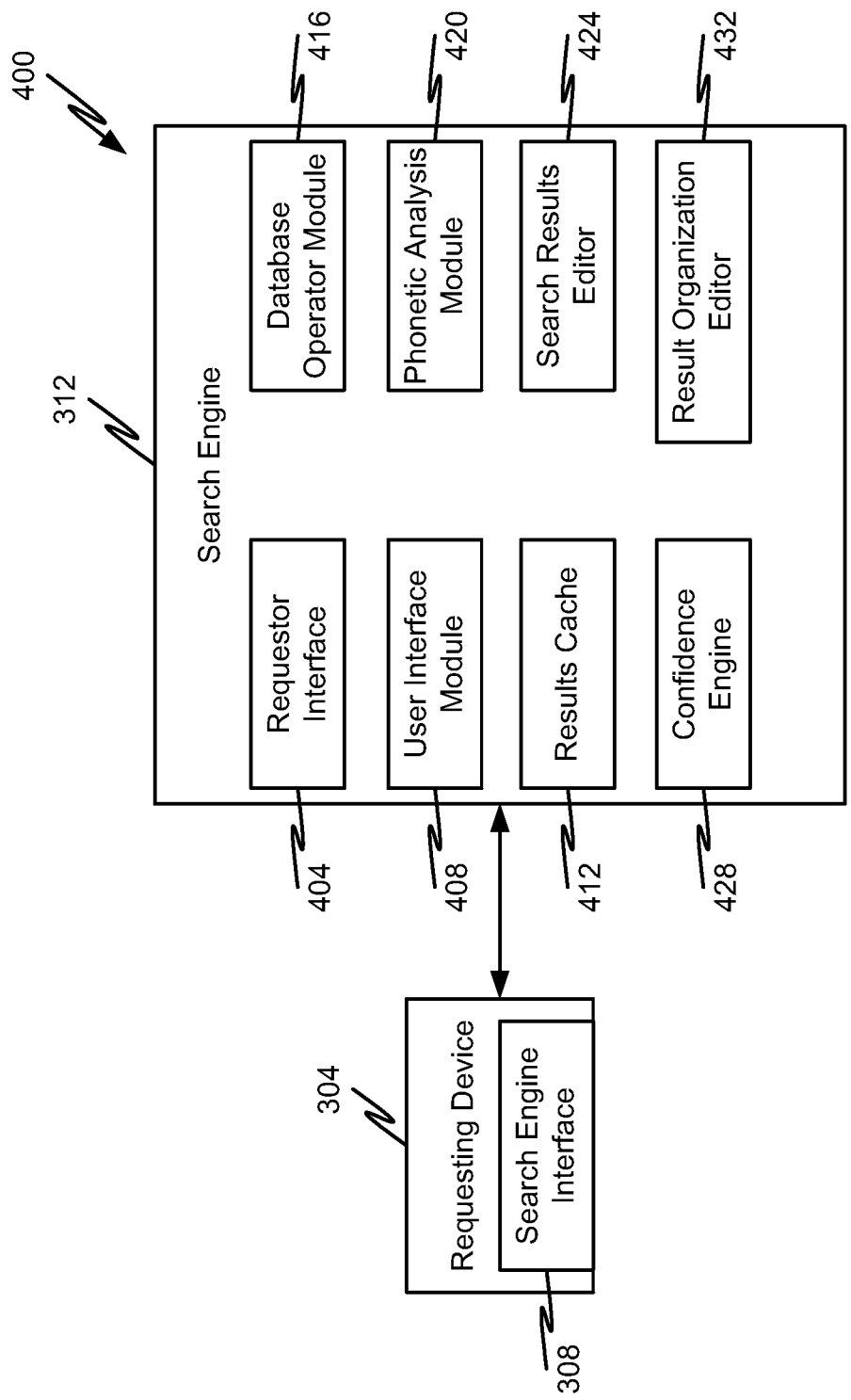
FIG. 4 is a block diagram depicting details of a search engine in accordance with embodiments of the present disclosure.

With reference now to FIG. 4, additional details of a search engine 312 will be described in accordance with at least some embodiments of the present disclosure. The components/functionality of the search engine 312, although depicted as being included within the search engine 312, may be implemented in any one or number of other devices depicted in the systems 100, 200, 300. The inclusion of the components in the search engine 312 is for illustrative purposes and is not intended to limit embodiments of the present disclosure. Furthermore, although not depicted, the search engine 312 may include one or many processors and non-transitory computer-readable memory that stores the various modules depicted in FIG. 4. The modules of the search engine 312 may be executed by the processor of the search engine 312. In some embodiments, the search engine 312 may be implemented as one or multiple servers or server blades.

The search engine 312 is depicted as including a requestor interface 404, a user interface module 408, a results cache 412, a database operator module 416, a phonetic analysis module 420, a search results editor 424, and a result organization editor 432. In some embodiments, the requestor interface 404 may correspond to an Application Programming Interface (API) that enables communication between the search engine 312 and an application variant of the search engine interface 308. Alternatively or additionally, the requestor interface 404 may correspond to one or more web pages that are accessible via web-based communications. Specifically, the requestor interface 404 may correspond to one or more HTML documents that enable a user of the requestor device 304 to access the functionality of the search engine 312 via use of a web browser.

The user interface module 408 may correspond to one or more components that control a presentation of the search engine interface 308. For instance, the user interface module 408 may be responsible for presenting a search term entry page to a user of the requesting device 304. Alternatively or additionally, the user interface module 408 may control a presentation of search results. For instance, the user interface module 408 may receive search results from the database interface 116 and prepare/organize the search results in an easy-to-use format. For instance, the user interface module 408 may be responsible for organizing the search results according to their relevance (e.g., more relevant results being placed higher and/or highlighted in the list of search results).

The results cache 412 may correspond to a memory location in the search engine 312 where initial search results received from the database 120 are stored such that they can be organized and/or modified prior to being presented to the user of the requesting device 304. More specifically, the results cache 412 may correspond to cache computer memory that stores all search results before the search results have phonetically-confusable terms removed therefrom. Alternatively or additionally, the results cache 412 may correspond to a location where historical search queries (e.g., what is sent to the database interface 116 by the search engine 312), terms (e.g., what is received from the user of the requesting device 304), and/or results (e.g., what is received back from the database 120 in response to a query) are stored for a predetermined amount of time. This may enable easier reference back to such search queries, terms, and/or results until such time as they are erased from or overwritten in the results cache 412.

The database operator module 416 may be responsible for formatting search queries to the database 120 based on terms and phonetically-confusable terms derived therefrom. Specifically, the database operator module 416 may receive a set of search terms in one format (e.g., a natural language format entry of one or more search terms) and then condition a search query consistent with the received search terms. In some embodiments, the database operator module 416 may include search operators (e.g., AND, NAND, OR, NOR, XOR, and BUT NOT) as logical connectors between search terms. The operators may be placed between search terms, phrases, or phrase portions. The database operator module 416 may be viewed as the interface between the database interface 116 and the search engine 312. In other embodiments, the search operators may be user-defined instead of being inferred by the database operator module 416. Specifically, instead of presenting the user with a natural language input, the user may be provided with Boolean search facilities in which the user is able to devise one or more operators to apply to various search terms. Thus, the user may be responsible for identifying the search terms that are to be excluded based on choice of operators.

The phonetic analysis module 420 may include functionality that allows the search engine 420 to perform an automated phonetic analysis on search terms received from the requesting device 304. In some embodiments, the phonetic analysis module 420 includes or has access to a phonetic dictionary that maps words/terms to phonemes. Said another way, the phonetic analysis module 420 may be able to derive the way a search term or phrase "sounds". The phonetic analysis module 420 may be configured to provide a mapping between terms and their sounds in one or many different languages. For instance, the phonetic analysis module 420 may be configured to provide a mapping for an English pronunciation of a term or phrase. Thus, the phonetic analysis module 420 may be language-dependent and may also be configured to derive sounds or pronunciations of search terms entered at the requesting device 304. Based on the derived sounds or pronunciation, the phonetic analysis module 420 may also derive or determine phonetically-confusable terms that are not the same as the search term(s), but sound similar to the search term(s). As will be discussed in further detail herein, these phonetically-confusable terms may be located in a phonetics map such that distances between terms and phonetically-confusable terms can be determined in an effort to exclude unwanted or unnecessary results prior to presentation to a user.

The search results editor 424 may work in cooperation with the phonetic analysis module 420 to modify search results. One way that search results can be modified is to remove phonetically-confusable terms from a set of search results. Alternatively or additionally, the search results editor 424 may provide the user interface module 408 with information that describes which search results are considered more relevant than other results, thereby enabling the user interface module 408 to properly organize the results for presentation to a user.

The result organization editor 432 may provide the search engine 312 with functionality that, when executed by a processor of the search engine 312, enables the intelligent organization and presentation of search results. More specifically, the result organization editor 432 may provide the search engine 312 with the ability to receive a plurality of search results from the database 120 and organize those results based on whether certain results are phonetically closer to a desired search term, an undesired search term, relative confidences of the true and competing match, and/or degrees of phonetic similarity between search results. For instance, the result organization editor 432 may be allowed to cluster or group search results in groupings based on phonetic similarities. As another example, those results which are determined to be phonetically closer to a desired search term AND which are determined to be phonetically distant (e.g., a larger phonetic distance away from) from the undesired search term may be organized at a more prominent location in the display of search results as compared to those results which are not as phonetically close to the desired search term OR which are determined to be phonetically closer to the undesired search term.

Figure 5A:
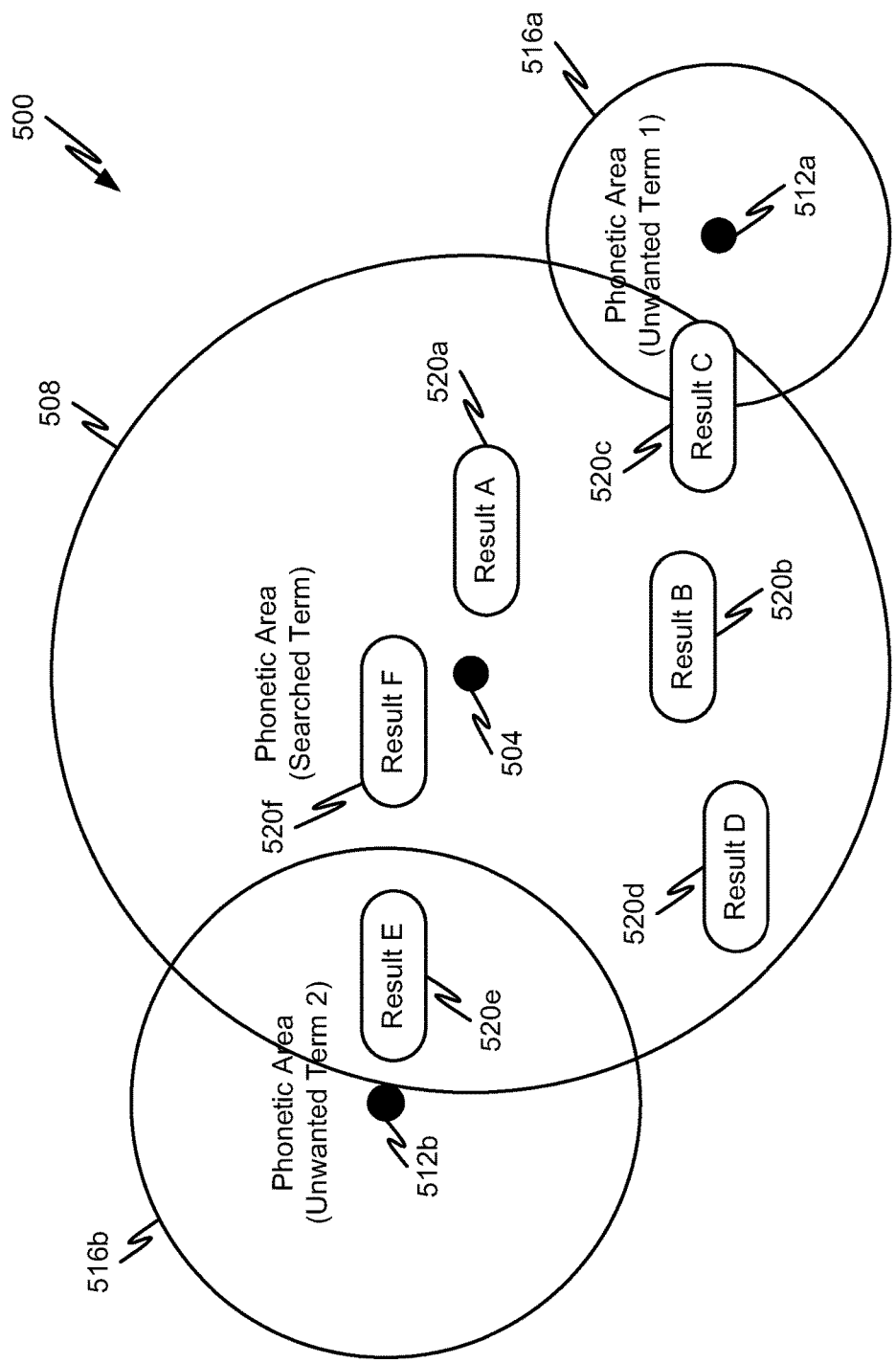
FIG. 5A depicts one possible scheme for automatically refining a phonetic search in accordance with embodiments of the present disclosure.
Figure 5B:
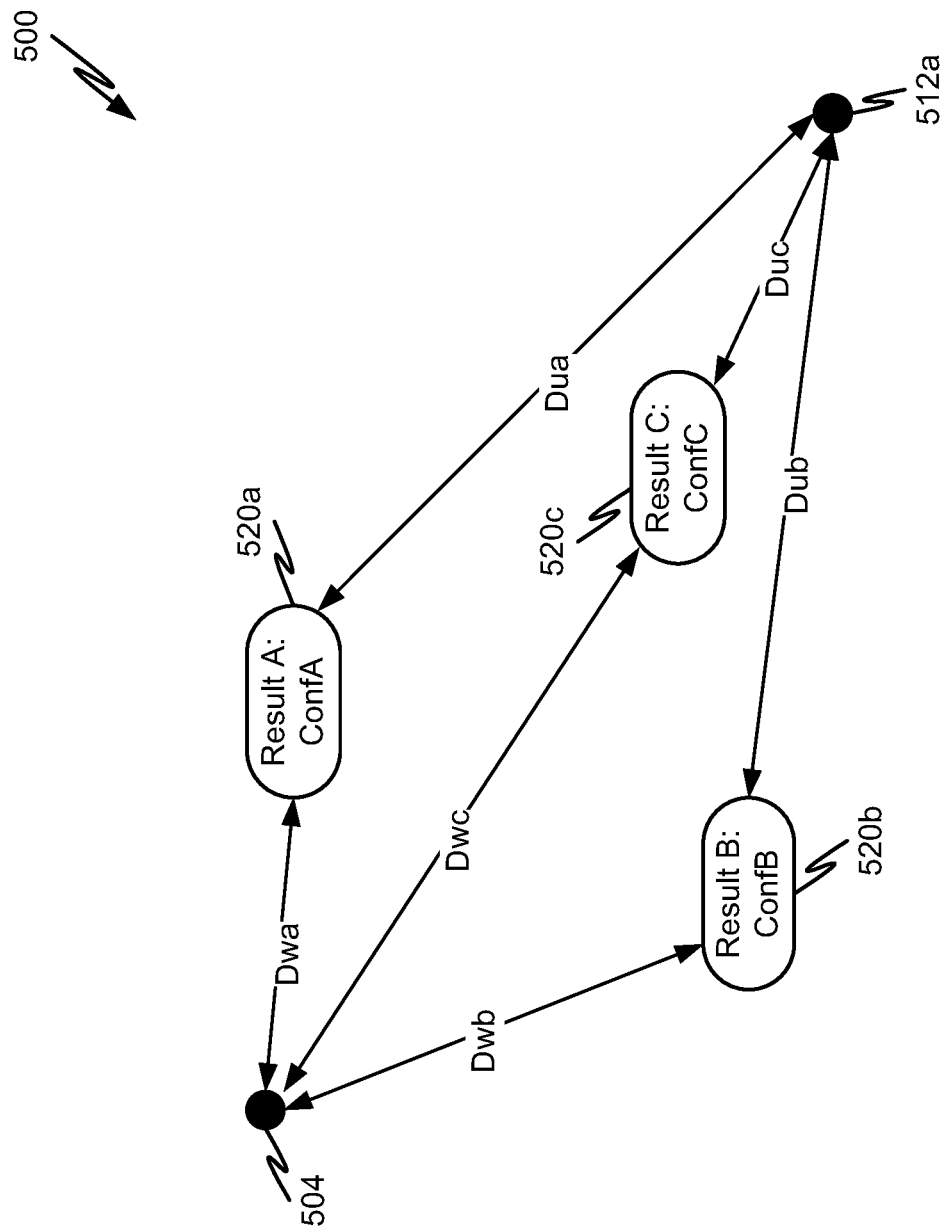
FIG. 5B depicts another possible scheme for automatically refining a phonetic search in accordance with embodiments of the present disclosure.
Figure 6A:
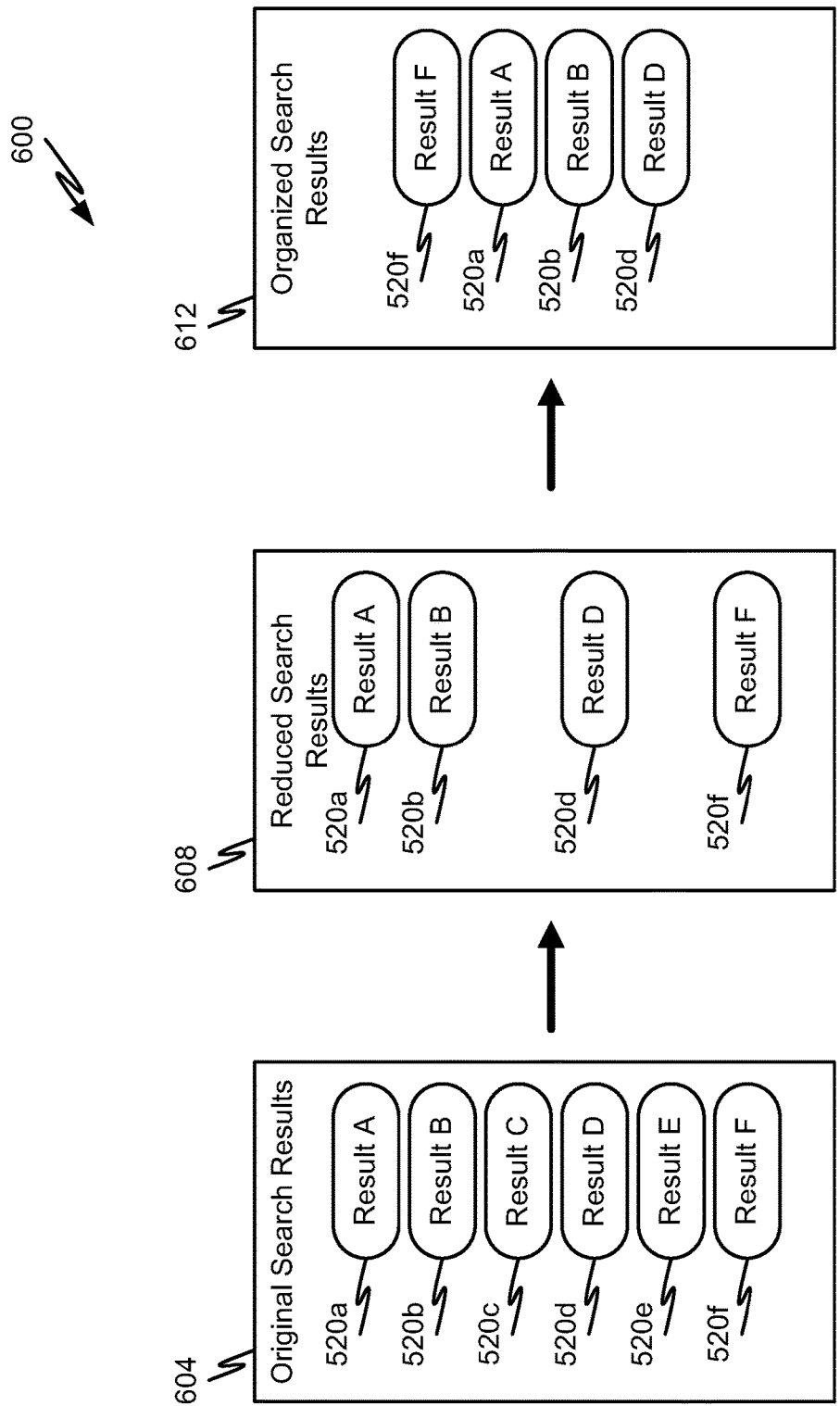
FIG. 6A is a block diagram depicting a first series of refined search results in accordance with embodiments of the present disclosure.

With reference now to FIGS. 5A, 5B, 6A, and 6B, details of reducing search results by removing phonetically-confusable terms from the search results and/or intelligently organizing search results based on phonetic statistics will be described. As shown in FIG. 6A, a flow 600 for reducing original search results 604 to reduced search results 608 and then organizing the reduced search results into organized search results 612 is shown. Compared with FIG. 6B, where the flow 600 depicts direct conversion of the original search results 604 to organized search results 612 based on a phonetic confidence score without reducing the search results. Either flow 600 from FIG. 6A or 6B may be utilized to retrieve and present search results to requesting users via their requesting device 304.

FIGS. 5A and 5B show two possible automated variations for identifying phonetically-confusable terms for a search term and then removing such phonetically-confusable terms. As used herein, the phrase "phonetically-confusable term" should be understood to include any term, phrase portion, or phrase that does not match the search term but which sounds similar enough to the search term that it gets included in search results with that search term (e.g., because a phonetic search is performed on the search term and the phonetic search returns both terms that include the searched term and phonetically-confusable terms for the search term).

Mechanisms for automating the process for identifying and removing/organizing phonetically-confusable terms are described herein as utilizing the concept of phonetic distance. FIGS. 5A and 5B show two possible variations for identifying terms and phonetically-confusable terms on a phonetic map 500, which may represent locations of terms and phonetically-confusable terms in a phonetic space. As discussed herein, the process for calculating or determining a phonetic distance may be dependent on a number of factors (e.g., number of common syllables, sequence of common syllables, number of common phonemes, sequence of common phonemes, number of different syllables, number of different phonemes, etc.). Any number of phonetic distance calculations can be used in accordance with embodiments of the present disclosure. Said another way, embodiments of the present disclosure are not limited to any particular algorithm or method of determining a phonetic distance. One non-limiting example of a process for calculating a phonetic distance is described in U.S. Pat. No. 6,581,034 to Choi et al., the entire contents of which are hereby incorporated herein by reference.

Furthermore, the maps 500 show certain features as being points on the map 500 whereas other features are shown as ovals or circles on the map 500. The illustration of certain features as ovals or circles is for illustrative purposes. It should be appreciated that almost every feature on the map 500 that corresponds to a single term or result should be represented as a point on the map 500. The phonetic distances may correspond to distances between such points and the phonetic areas may correspond to areas produced in the phonetic space based on phonetic distances (e.g., a multiplication of phonetic distances or a multiplication of a phonetic distance by some value).

In a first example, FIG. 5A shows a map 500 with a search term 504 and two phonetically-confusable terms 512a, 512b. A search area 508 is determined for the search term 504. The size and extent of the search area 508 may depend upon a user or administrator's preferences for receiving false positive search results or excluding potentially relevant results. In the depicted embodiment, the search area 508 encompasses and captures a plurality of search results 520a-f. These search results correspond to results for the search term 504 when a phonetic search is carried out for the search term 504 in the database 120. In some embodiments, it may be desirable to exclude some of the results 520a-f in the original search results 604 to arrive at a set of reduced search results 608. FIG. 5A shows a mechanism where phonetically-confusable terms 512a, 512b are defined as points and then unwanted term areas 516a, 516b are respectively computed for those phonetically-confusable search terms 512a, 512b. In some embodiments, the unwanted term areas 516a, 516b may be larger or smaller than the search area 508, again depending upon user and/or administrator preferences.

If a search result 520a-f is situated in both the search area 508 and an unwanted term area 516a or 516b, then that search result is removed from the original search results 604 to arrive at the reduced search results 608. In the depicted example, two results 520c and 520e are found to be within at least one of the unwanted term areas 516a, 516b, which means that those results are removed from the original search results 604 to arrive at the reduced search results 608. As can be appreciated, this removal may occur after search results 520a-f are retrieved from the database 120 or they may be preemptively eliminated from the search results retrieved from the database 120 by using a "BUT NOT" operator. In either scenario, the useful result is achieved where the phonetically-confusable terms are removed from or organized differently within the original search results 604 to obtain the reduced search results 608 or organized search results 612. These reduced search results 608 may be further organized according to distance from the search term 504, whereby the closest result (e.g., result 520f, then result 520a, then result 520b, then result 520d) are prioritized in ascending or descending order, again depending upon user and/or administrator preferences as shown in FIG. 6A.

Figure 6B:
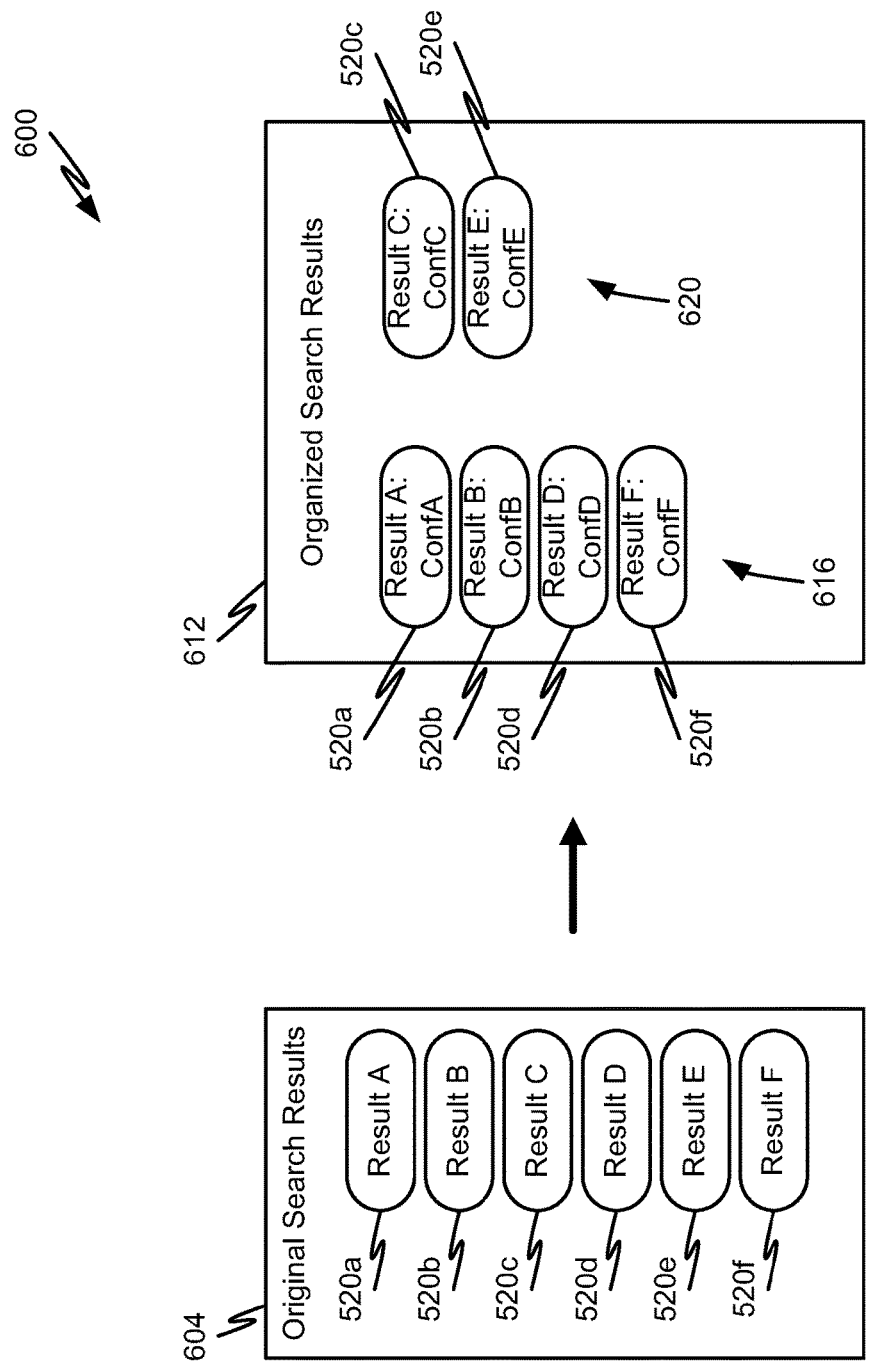
FIG. 6B is a block diagram depicting a second series of refined search results in accordance with embodiments of the present disclosure.

Alternatively, the original search results 604 may all be organized according to distance from the search term 504, distance from one another, distance from the unwanted search terms 512a, 512b, or based on some other phonetic statistic as shown in FIG. 6B. More specifically, two clusters of search results may be presented via the search engine interface 308, a first cluster of search results 616 may present those results (e.g., result 520a, result 520b, result 520d, and result 520f) which are phonetically closer to the search term 504 and phonetically closer to one another (or which have a higher phonetic confidence score associated therewith) in a more prominent display position whereas a second cluster of search results 620 may present those results (e.g., result 520c and result 520e) that are phonetically closer to the undesired search terms 512a, 512b (or which have a lower phonetic confidence score associated therewith) in a less prominent display position.

FIG. 5B shows a second alternative for reducing search results obtained from a phonetic search of a database 120. The map 500 of FIG. 5B is similar but reduced as compared to the map 500 of FIG. 5A for ease of discussion. Specifically, only those results lying between the search term 504 and the first unwanted term 512a are depicted. It should be appreciated, however, that this map 500 can easily be extended to show multiple search terms 504 and/or multiple unwanted terms 512. Each result 520a, 520b, 520c may have two phonetic distances calculated in association therewith. A first distance calculated for each result may correspond to a distance between the result 520a, 520b, 520c and the search term 504. In the depicted embodiment, these first distances correspond to Dwa (distance from wanted search term 504 to first result 520a), Dwb (distance from wanted search term 504 to second result 520b), and Dwc (distance from wanted search term 504 to third result 520c). A second distance calculated for each result may correspond to a distance between the result 520a, 520b, 520c and the unwanted or phonetically-confusable search term 512a). In the depicted embodiment, these second distances correspond to Dua (distance from unwanted search term 512a to the first result 520a), Dub (distance from unwanted search term 512a to the second result 520b), and Duc (distance from unwanted search term 512c to the third result 520c).

The first and second distance for each result 520a, 520b, 520c can be compared and/or used to determine whether a result should be included in reduced search results 608 or excluded from reduced search results 608. As one example, if a first distance (e.g., a distance to the wanted search term 504) is smaller than a second distance (e.g., a distance to the unwanted search term 512) for a result, then that result should be included in the reduced search results 608. Conversely, if a first distance is larger than a second distance for a result, then that result should be excluded from the reduced search results 608. Handling the unlikely scenario where the first and second distances are equal may be governed by user and/or administrator preferences for over inclusion or under inclusion of results. In another example, if the first distance is smaller than a predetermined fraction of the second distance for a result (and the predetermined fractional value can be user/administrator configurable), then that result can be included in the reduced search results 608. It should be appreciated embodiments of the present disclosure contemplate including any other mechanism for manipulating the first and second distances of the search results 520 to determine whether the result 520 should be included or excluded from the reduced search results 608.

The phonetic distances can also be used to calculate other phonetic statistics for each of the results. As a non-limiting example, a phonetic confidence score can be calculated for each result. One way of calculating a phonetic confidence score can be to calculate an inverse ratio of the phonetic distance from the wanted search term 504 and the phonetic distance from each of the unwanted search terms 512. Continuing this example, a phonetic confidence score for the first result 520$a$ would be calculated by Dua/Dwa. The phonetic confidence score for the first result 520$a$ would be larger than the phonetic confidence score for the third result 520$c$ (e.g., Duc/Dwc) because the both Dua>Duc and because Dwa<Dwc. As shown in FIG. 6B, the phonetic confidence scores for the search results may also be displayed along with the results themselves to allow the viewing user to make their own judgment about whether a particular search result is worth further analysis or not.

Figure 7:
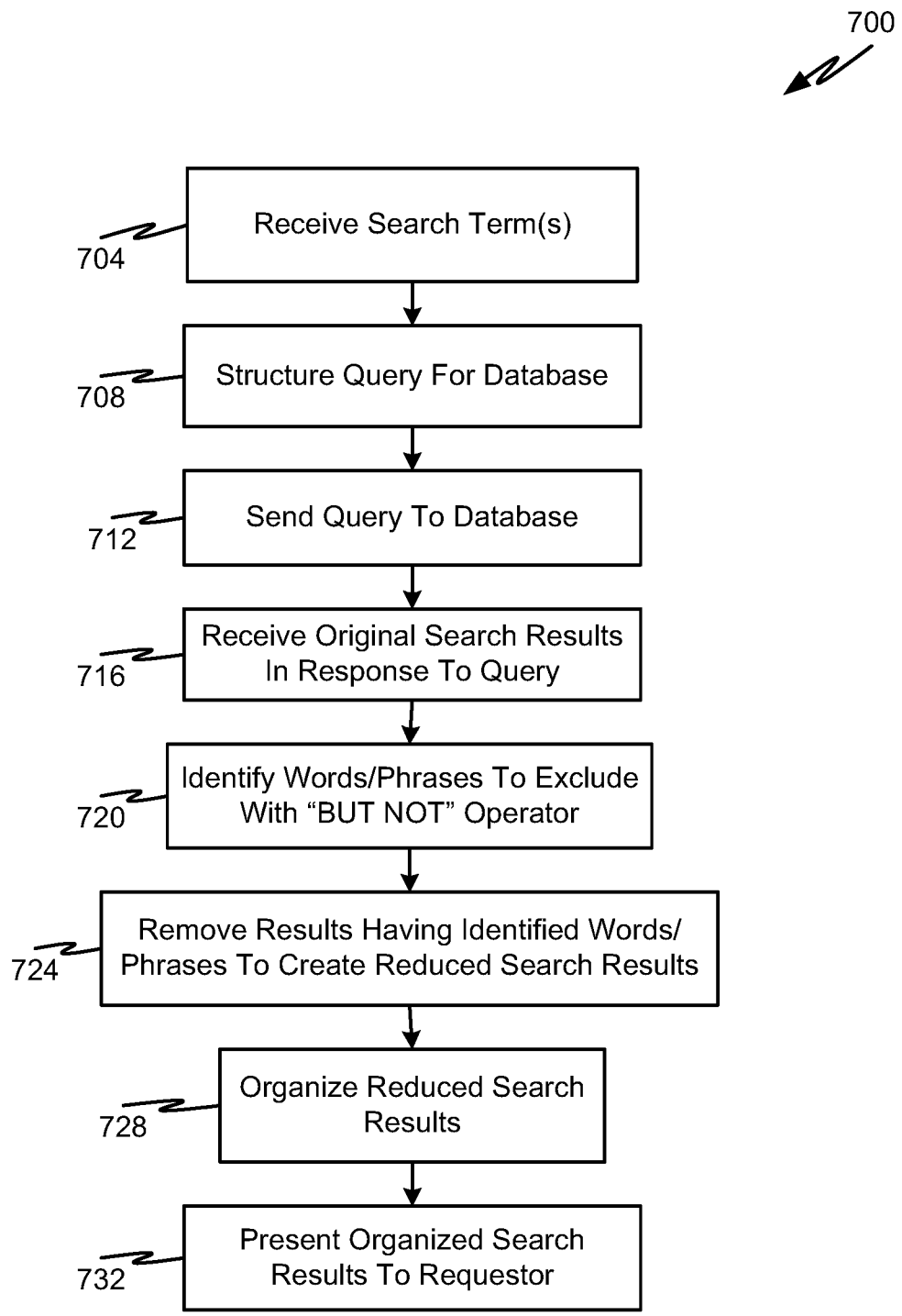
FIG. 7 is a flow diagram depicting a method for performing a phonetic search in accordance with embodiments of the present disclosure.

With reference now to FIG. 7, a method for performing a phonetic search will be described in accordance with embodiments of the present disclosure. The method 700 begins when one or more search terms are received from a user (step 704). The search terms may be entered by a user into the search engine interface 308. The search term(s) are used by the search engine 312 to structure or otherwise prepare a query for the database 120 (step 708). In some embodiments, the search term(s) are simply input into the query as they are received, in other embodiments the search term(s) are input into the query with one or more database query operators combining the term(s). Furthermore, the query may be conditioned according to the type of database 120 being queried and the language used to interact therewith.

The query containing the search term(s) is then sent to the database 120 (step 712). Thereafter, original search results 604 are received back from the database 120 (step 716). These original results 604 may be stored in the results cache 412 for further processing before being transmitted back to the user.

In some embodiments, an analysis of the original results 604 may include determining whether the search term(s) have any phonetically-confusable terms associated therewith (step 720). In some embodiments, the phonetically-confusable terms themselves may be identified by determining if any of the search term have already-known phonetically-confusable terms associated therewith (e.g., by referencing a phonetic dictionary and determining whether the term has one or more phonetically-confusable terms associated therewith). In other embodiments, phonetically-confusable terms may be identified by computing phonetic distances or areas (which may be programmatically administered) for the search term and then determining if any non-search-term falls within the computed phonetic distance or area. This particular step is slightly different from the analysis described in connection with FIGS. 5A, 5B, and 6 because this analysis of step 720 is used in connection with identifying unwanted search terms 512, not determining whether results should be included or excluded from the original search results 604. Identification of phonetically-confusable terms may also be done with the assistance of user input or with a computer learning system.

Still other ways of identifying phonetically-confusable terms, such as those used in preparing suggestions for expanding search strings to capture phonetic misspellings, can also be used. An example of such technology used to expand search strings to correct for phonetic misspellings is described in U.S. Pat. No. 7,716,235 to Davallou, the entire contents of which are hereby incorporated herein by reference. This technology is different from the technology of the present disclosure, however, because the phonetically-confusable terms can be identified using the technology of '235 patent to later be used to exclude results from original search results. Thus, instead of expanding a search string as in the '235 patent, the present disclosure identifies phonetically-confusable terms in an attempt to remove search results from a list of original search results 604.

Once phonetically-confusable term(s) are identified for the search term(s), the original results 604 may be reduced to a set of reduced search results 608 as described in connection with FIGS. 5A, 5B, and 6 (step 724). It should be appreciated that step 724 is an optional step and does not necessarily need to be performed. Thereafter, the reduced search results 608 (or original search results 604) may be organized into organized search results 612 (step 728) and then presented to the search results requestor (step 732).

Figure 8:
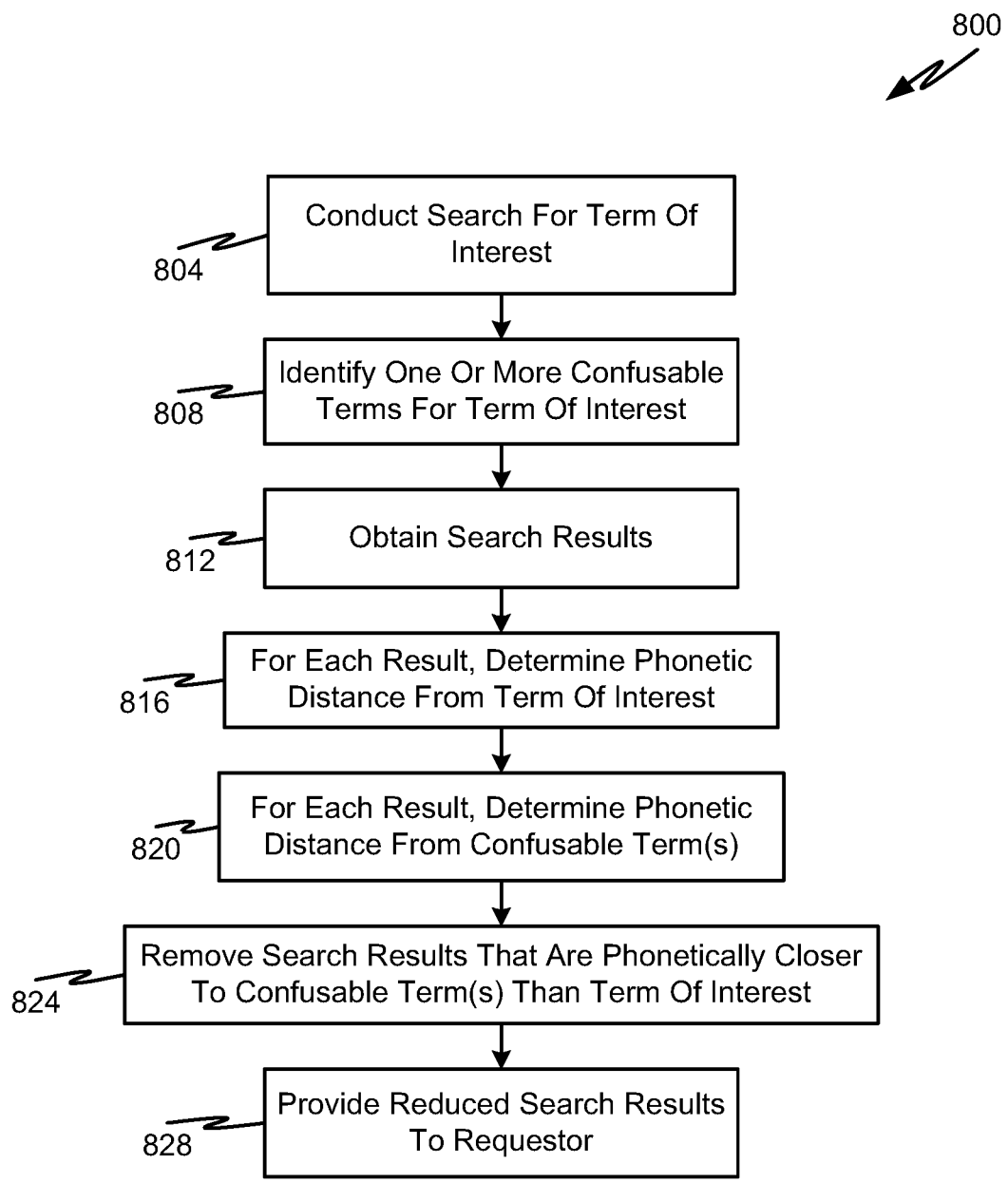
FIG. 8 is a flow diagram depicting a method for refining a phonetic search in accordance with embodiments of the present disclosure.

With reference now to FIG. 8, a method of refining a phonetic search will be described in accordance with embodiments of the present disclosure. The method 800 begins when a phonetic search is performed on a database 120 for one or more terms of interest (step 804). The method continues with the identification of one or more phonetically-confusable terms associated with each term of interest included in the search (step 808). The process of step 808 may be similar or identical to the process described in connection with step 720.

Before, simultaneous with, or following step 808, the method 800 continues when original search results 604 are obtained at the search engine 312 (step 812). For each result, phonetic distances are calculated between the result and the term of interest (step 816). This distance may be referred to as a first calculated phonetic distance for the result. For each result, phonetic distances are also calculated between the result and each of the phonetically-confusable terms identified in step 812 (step 820). This distance for each result may be referred to as a second calculated phonetic distance for the result.

Based on the phonetic distances calculated for each result, the original search results 604 are reduced to a set of reduced results 608 (step 824). As one example, each result that is phonetically closer to one or more confusable terms than to a term of interest is removed. Other algorithms and mechanisms may be used to remove results from the original search results 604. Again, step 824 is an optional step that does not necessarily need to be performed if the entirety of the search results are being presented or organized based on some phonetic statistic calculated therefor.

If reduced, the search results 608 may be provided to the requestor or they may be organized according to relevance prior to being provided to the requestor (step 828). Alternatively, the original search results 604 may be organized according to the phonetic statistics prior to being provided to the requestor in step 828. The results may be provided to the requestor via a user interface of a communication device 108 operated by the user (e.g., via a search engine interface 308).

Figure 9:
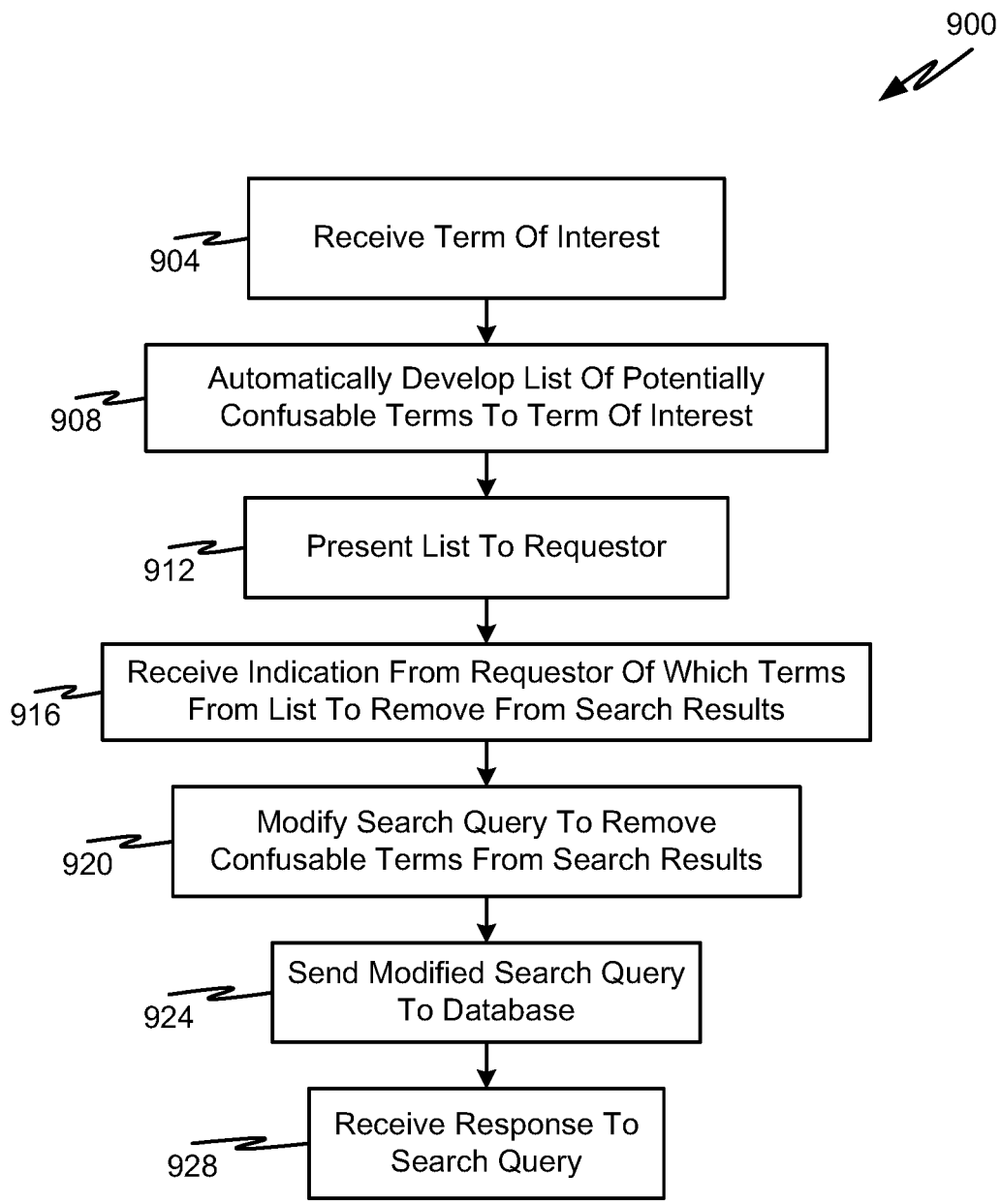
FIG. 9 is a flow diagram depicting a method for modifying a search query prior to sending the search query to a database in accordance with embodiments of the present disclosure.

With reference now to FIG. 9, a method of modifying a search query prior to sending the search query to a database 120 will be described in accordance with embodiments of the present disclosure. The method 900 begins with the receipt of search terms, which may also be referred to as terms of interest (step 904). Upon receiving the terms of interest, the search engine 312 may automatically develop a list of potentially phonetically-confusable terms for each term of interest (step 908). The identification of potential phonetically-confusable terms may be done in a similar fashion to steps 720 or 808. In some embodiments, the potential phonetically-confusable terms may be automatically used to reduce the search terms and/or adjust the query being sent to the database 120. In other embodiments, user input may be requested by providing a list of the potentially phonetically-confusable terms to the user that entered the search to let the user decide whether to exclude such phonetically-confusable terms from the search query (step 912).

If the list is presented to the user, then the method will wait to receive an indication from the user of which terms from the list to remove from the search query (step 916). In some embodiments, the user may provide standing instructions that indicate only certain types of phonetically-confusable terms should be excluded (e.g., terms that are within a predetermined phonetic distance of a search term). Alternatively, the user may require that user input is received prior to modifying the search query.

Following completion of steps 912 and 912 or the optional skipping of such steps due to a completely automated implementation, the method 900 continues by modifying the search query to remove the phonetically-confusable terms from the search results that will be received back from the database 120 (step 920). In some embodiments, this is accomplished by modifying the search query to include one or more "BUT NOT" operators for each of the phonetically-confusable terms.

The modified search query is sent to the database 120 (step 924) according to the language used between the database 120 and the database interface 116. Thereafter, results to the search query are received at the database interface 116 and provided to the search engine 312 (step 928). These results can then be provided directly to the requestor or modified according to relevance.

Figure 10:
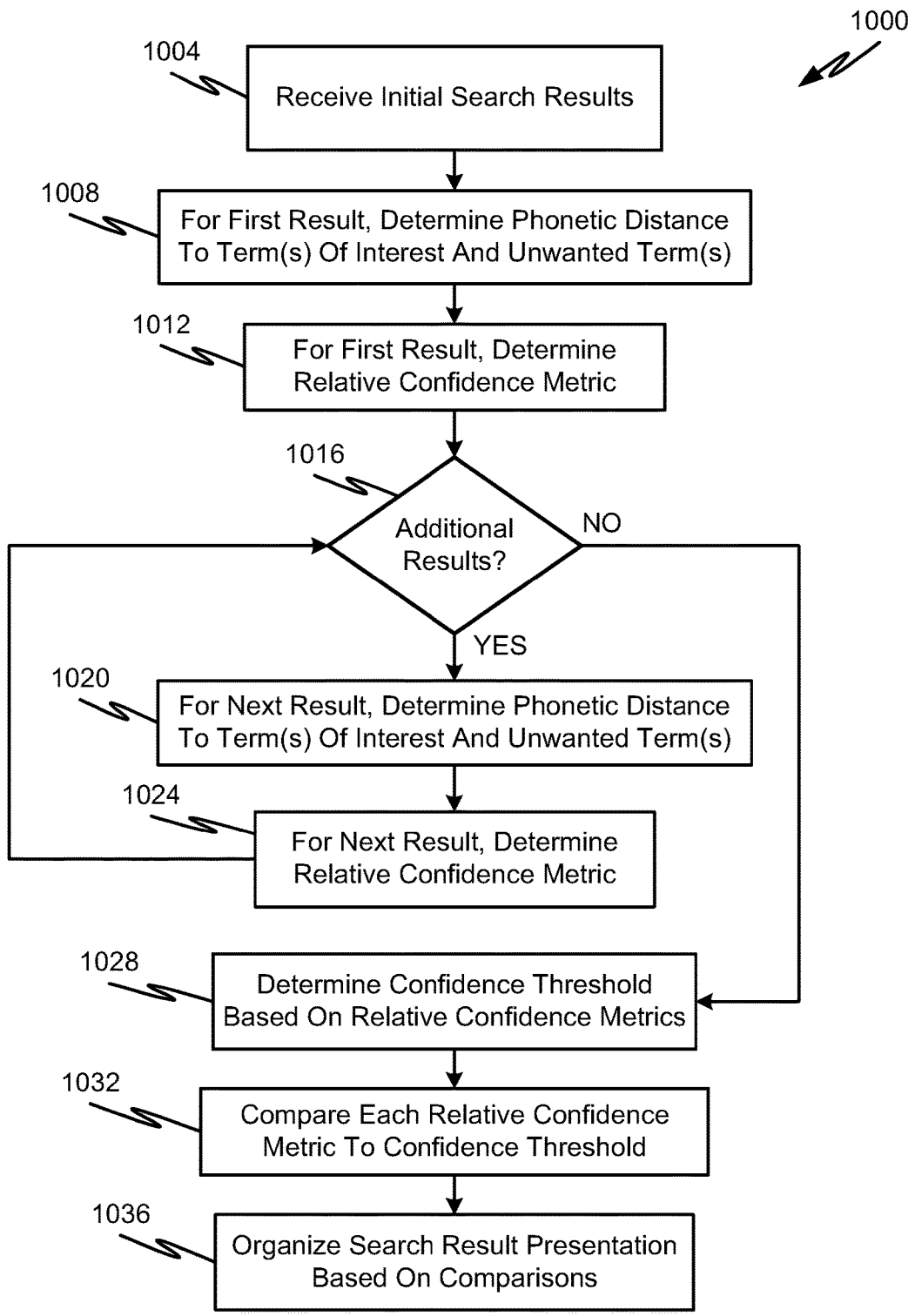
FIG. 10 is a flow diagram depicting a method of organizing speech search results based on relative confidence metrics.

With reference now to FIG. 10, a method of organizing speech search results based on relative confidence metrics will be described in accordance with at least some embodiments of the present disclosure. The method 1000 begins when initial search results are received back from the database 120 (step 1004). The method continues by determining a phonetic distance between a first result in the set of results and the wanted term(s) or search term(s) (e.g., term(s) of interest). Concurrent with this determination or sequential with this determination, a phonetic distance between the first result and each of the unwanted term(s) or undesired term(s) is determined (step 1008).

The phonetic distance metrics determined in step 1008 are then used to determine a relative confidence metric for the first result (step 1012). As discussed above, any number of models may be used to calculate the relative confidence metric for the first result. One non-limiting example of such a model is to calculate an inverse ratio of the phonetic distance from wanted search terms and the phonetic distances from unwanted search terms. If multiple wanted or unwanted search terms were included in the search request, then the average of phonetic distances for wanted or unwanted search terms may be determined (or some other weighted summation may be calculated). An inverse ratio between the averages may then be determined. Other methods of describing the phonetic closeness or phonetic proximity between a search result and wanted/unwanted search terms may also be used. It should also be appreciated that a relative confidence metric may also be determined based on the relative closeness of a search result to other results. For instance, if a large number of search results are relatively phonetically close to one another (e.g., form a logical cluster), then the results belonging to that cluster may receive a higher relative confidence metric than those results not belonging to that cluster.

The method proceeds by determining if there are additional search results that have not had a relative confidence metric calculated therefor (step 1016). If this query is answered positively, then the method proceeds by determining phonetic distance metrics for the next result in the set of results (step 1020) and calculating a relative confidence metric for that next result based on the phonetic distance metrics (step 1024). The method then returns to step 1016 to make another inquiry.

Once the inquiry of step 1016 is answered negatively, the method continues by further determining confidence thresholds (step 1028). In some embodiments, the confidence thresholds may be programmatically set prior to the search being performed. In some embodiments, the confidence thresholds may be search dependent, in which case the confidence thresholds may be determined based on the relative confidence metrics of some or all of the search results in the set of search results. More specifically, a confidence threshold could be computed for each set of search results based on the relative confidence of each search result being a true match as compared to a competing match.

The relative confidence metric for each search result is then compared to the confidence threshold (step 1032) to determine which, if any, of the search results should be removed from the presentation of search results to the user. Alternatively or additionally, the comparison of the relative confidence metrics to the confidence threshold may be used to organize some or all of the search results (step 1036). For instance, the threshold may be used to cluster or organize the search results into two groups (e.g., one group considered more relevant and another group considered less relevant). In some embodiments, multiple thresholds may be determined and applied to the search results to divide the search results into more than two groups. As an example, the utilization of multiple thresholds may enable the organization of the search results based on clusters within the phonetic space.

Figure 11:
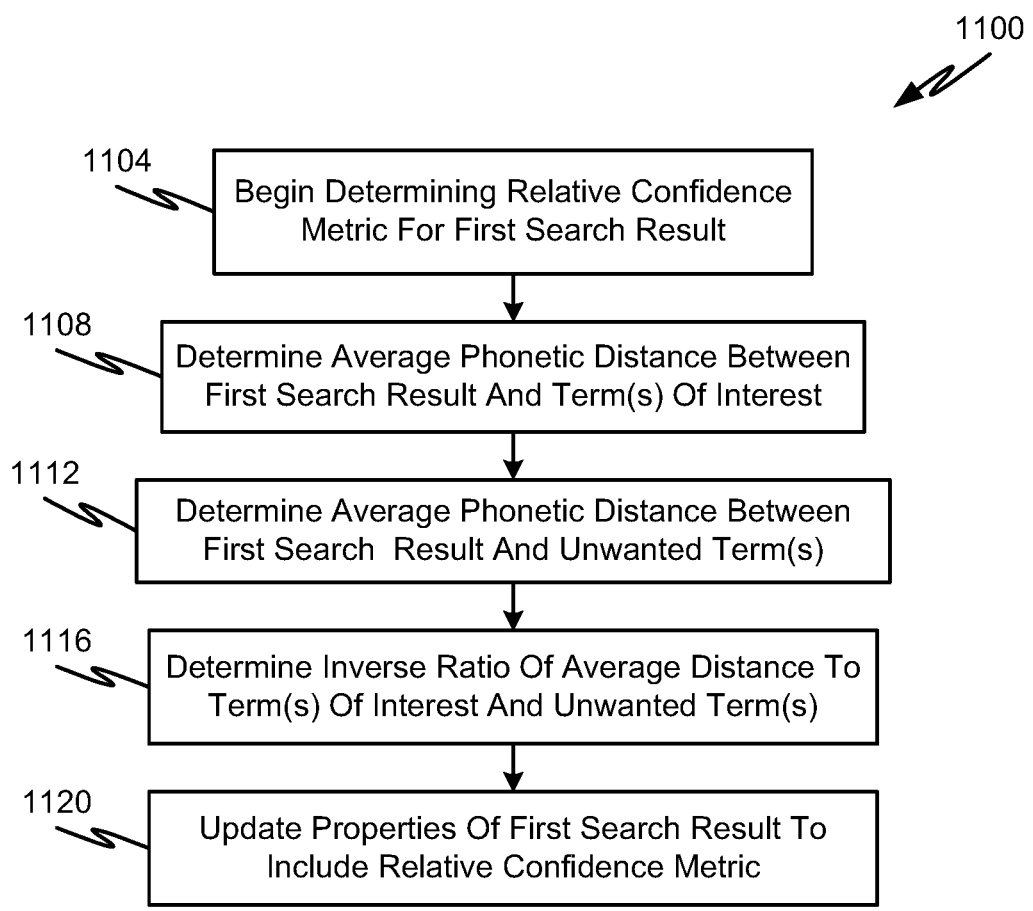
FIG. 11 is a flow diagram depicting a method for updating properties of a search to include relative confidence metrics.

With reference now to FIG. 11, a flow diagram depicting a method for updating properties of a search to include relative confidence metrics will be described in accordance with at least some embodiments of the present disclosure. The method 1100 begins by determining a relative confidence metric is to be calculated for a first search result (step 1104). Upon making such a determination, the method continues by determining an average phonetic distance between the first search result and term(s) of interest (step 1108). This may correspond to a true average or a weighted average. The method continues by determining an average phonetic distance between the first search result and unwanted term(s) (step 1112). This may also correspond to a true or weighted average.

Thereafter, an inverse ratio of the average distance to term(s) of interest and unwanted term(s) is calculated (step 1116). This inverse ratio may correspond to an actual confidence metric or an input to determining a confidence metric for the first search result. Accordingly, properties of the first search result may be updated to include the relative confidence metric (step 1120). This property may be used to organize the first search result relative to other search results and may also be presented as part of presenting the first search result. The determined relative confidence metric may be maintained as a property of the first search result even after the search results are no longer being viewed by a user. For instance the properties of the relative confidence metric may be stored along with the first search result in a cache of the search history performed by the user or in some other search history log.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A phonetic search engine, comprising:
a processor; and a computer-readable storage medium storing computer readable instructions which, when executed by the processor, cause the processor to perform steps comprising:
receiving one or more search terms for a phonetic search to be performed on a database containing phonetically-searchable content;
receiving one or more undesired terms associated with the phonetic search;
generating a database query including at least one of the received one or more search terms and one or more undesired terms;
transmitting the database query to the database;
receiving a set of search results from the database in response to the database query;
deriving one or more relative confidence metrics from a determined phonetic distance metrics which are the phonetic distances from each search result to one or more search terms, and the phonetic distance from each search result to one or more undesired terms;
organizing the set of search results for presentation based on the derived one or more relative confidence metrics;
one or more search results from the set of search results are not displayed when the one or more search results are phonetically closer to an undesired term of the undesired terms than any one of the one or more search terms; and
displaying the organized set of search results on a user interface.

2. The phonetic search engine of claim 1, wherein a first search result in the set of search results comprises a first relative confidence metric associated therewith, wherein a second search result in the set of search results comprises a second relative confidence metric associated therewith, wherein the first confidence metric is greater than the second confidence metric, and wherein the steps further comprise causing the first search result to be presented via a search engine interface in a more prominent position than the second search result.

3. The phonetic search engine of claim 2, wherein the first relative confidence metric is greater than the second confidence metric due to the first search result having a shorter phonetic distance than the second search result to a desired search term in the one or more search terms.

4. The phonetic search engine of claim 2, wherein the one or more search terms comprises a desired search term and an undesired search term, wherein the undesired search term is phonetically similar to the desired search term, wherein the first search result is a first phonetic distance away from the desired search term and a second phonetic distance away from the undesired search term, wherein the second search result is a third phonetic distance away from the desired search term and a fourth phonetic distance away from the undesired search term.

5. The phonetic search engine of claim 4, wherein the first relative confidence metric is determined by calculating an inverse ratio of the first phonetic distance and second phonetic distance and wherein the second relative confidence metric is determined by calculating an inverse ratio of the third phonetic distance and the fourth phonetic distance.

6. The phonetic search engine of claim 4, wherein the database query comprises a "BUT NOT" operator between the desired search term and the undesired search term.

7. The phonetic search engine of claim 1, wherein the one or more relative confidence metrics for each result in the set of search results accounts for relative phonetic distances between search results in the set of search results.

8. The phonetic search engine of claim 1, wherein the phonetic distance metrics used to derive the one or more relative confidence metrics include one or more of a number of common syllables, a sequence of common syllables, a number of common phonemes, a sequence of common phonemes, a number of different syllables, and a number of different phonemes.

9. The phonetic search engine of claim 1, wherein the phonetically-searchable content comprises at least one of audio and video content from a communication session between two or more session participants.

10. The phonetic search engine of claim 1, wherein the presentation of the set of search results includes a clustering of search results that are phonetically clustered with one another.

11. A system, comprising:
one or more servers configured to provide an interface between a user communication device and a database, wherein the database contains phonetically-searchable content, wherein the one or more servers include a search engine, wherein the search engine is configured to
receive one more search terms for a phonetic search to be performed on the database, wherein the one or more servers comprise a processor, wherein the processor;
retrieves a set of search results from the database in response to a database query, wherein the database query comprises one or more search terms and one or more undesired terms for a phonetic search to be performed on the database;
derives one or more relative confidence metrics from a determined phonetic distance metrics which are the phonetic distances from each search result to one or more search terms, and the phonetic distance from each search result to one or more undesired terms;
organizes the set of search results retrieved from the database based on the derived one or more relative confidence metrics,
one or more search results from the set of search results are not displayed when the one or more search results are phonetically closer to an undesired term of the undesired terms than any one of the one or more search terms; and
displaying the organized set of search results on a user interface.

12. The system of claim 11, wherein the one or more relative confidence metrics represent a confidence that a search result is closer to a desired search term than an undesired search term.

13. The system of claim 12, wherein the database query comprises a "BUT NOT" operator associating the desired search term and the undesired search term.

14. The system of claim 11, wherein the phonetic distance metrics include a phonetic distance between the search result and the desired search term and a phonetic distance between the search result and the undesired search term.

15. The system of claim 14, wherein the phonetic distance metrics further include a phonetic distance between the search result and at least one other search result in the set of search results.

16. The system of claim 14, wherein a relative confidence metric for the search result comprises an inverse ratio of the phonetic distance between the search result and the desired term and the phonetic distance between the search result and the undesired search term.

17. The system of claim 14, wherein phonetic distances are determined, at least in part, by considering one or more of a number of common syllables, a sequence of common syllables, a number of common phonemes, a sequence of common phonemes, a number of different syllables, and a number of different phonemes.

18. The system of claim 11, wherein the phonetically-searchable content comprises at least one of audio and video content from a communication session between two or more session participants.

19. A method of performing phonetic searches, the method comprising:
receiving, by a processor, one or more search terms for a phonetic search to be performed on a database containing phonetically-searchable content;
receiving, by the processor, one or more undesired terms associated with the phonetic search;
generating, by the processor, a database query that includes at least one of the received one or more search terms and one or more undesired terms;
transmitting, by the processor, the database query to a database interface;
receiving, by the processor, a set of search results from the database interface in response to the database query;
deriving, by the processor, one or more relative confidence metrics from a determined phonetic distance metrics which are the phonetic distances from each search result to one or more search terms, and the phonetic distance from each search result to one or more undesired terms;
organizing, by the processor, the set of search results based on the derived one or more relative confidence metrics;
one or more search results from the set of search results are not displayed when the one or more search results are phonetically closer to an undesired term of the undesired terms than any one of the one or more search terms; and
displaying the organized set of search results on a user interface.

20. The method of claim 19, further comprising:
calculating, by the processor, a phonetic distance to a desired search term included in the database query for each result in the set of search results;
calculating, by the processor, a phonetic distance to an undesired search term included in the database query for each result in the set of search results;
determining, by the processor, an inverse ratio of the phonetic distance to the desired search term and the phonetic distance to the undesired search term for each result in the set of search results; and
including, by the processor, the inverse ratio in the one or more relative confidence metrics.

* * * * *